Figure 1:
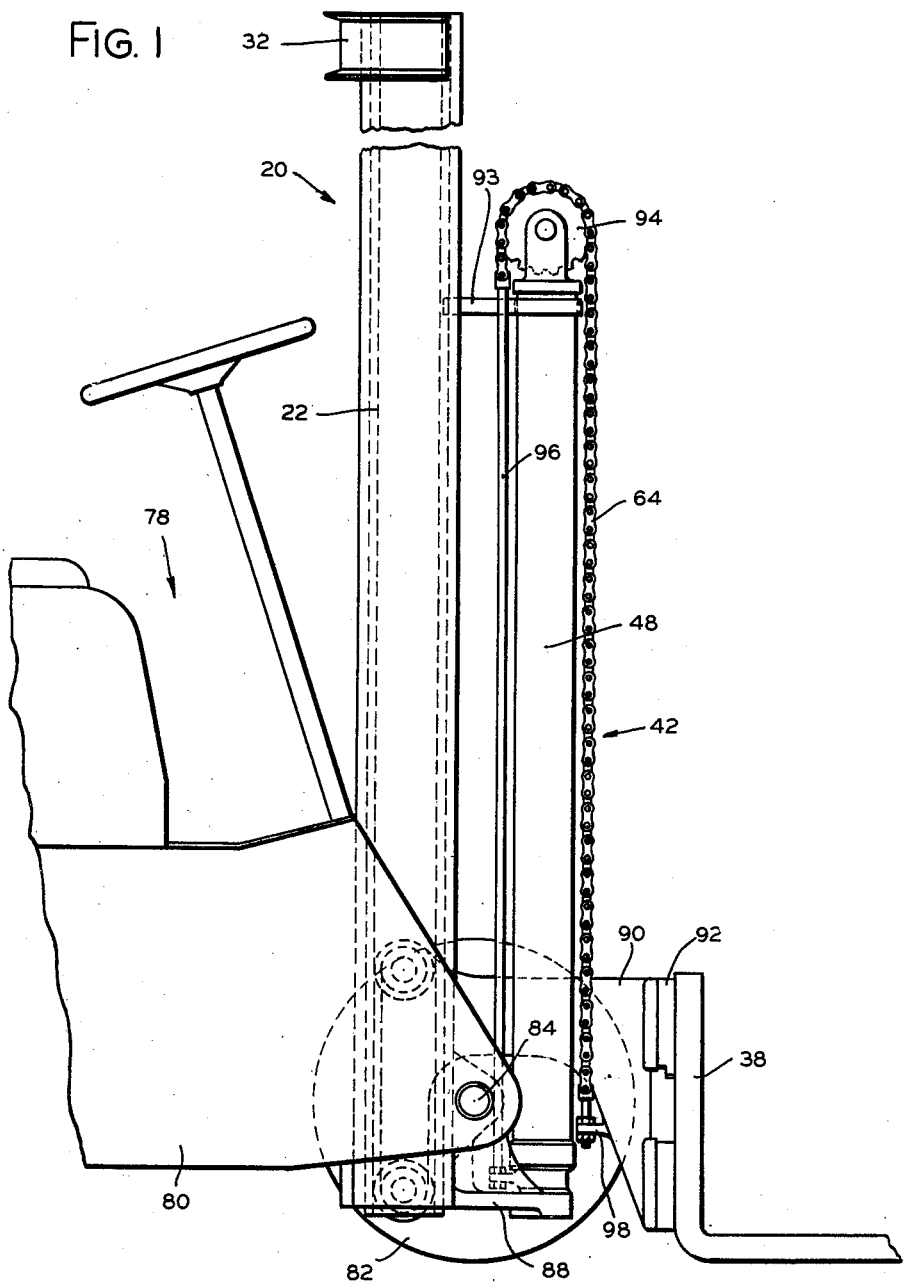

April 7, 1964   H. W. HOSBEIN ETAL   3,127,956
LIFT TRUCK
Original Filed Feb. 25, 1954   3 Sheets-Sheet 1

INVENTORS.
HUGH W. HOSBEIN
ROBERT LAPSLEY
BY J. Frederick Bechtel
ATTY

April 7, 1964    H. W. HOSBEIN ETAL    3,127,956
LIFT TRUCK

Original Filed Feb. 25, 1954    3 Sheets-Sheet 2

*INVENTORS.*
HUGH W. HOSBEIN
ROBERT LAPSLEY
BY
*J. Frederick Bechtol*
ATTY.

April 7, 1964  H. W. HOSBEIN ETAL  3,127,956
LIFT TRUCK

Original Filed Feb. 25, 1954   3 Sheets-Sheet 3

INVENTORS
HUGH W. HOSBEIN
ROBERT LAPSLEY
BY
*P. C. Wiessler*
ATTY.

United States Patent Office 3,127,956
Patented Apr. 7, 1964

3,127,956
LIFT TRUCK
Hugh W. Hosbein, Niles, and Robert Lapsley, Berrien Springs, Mich., assignors to Clark Equipment Company, a corporation of Michigan
Original application Feb. 25, 1954, Ser. No. 412,439. Divided and this application Nov. 16, 1961, Ser. No. 163,003
6 Claims. (Cl. 187—9)

Our present invention relates generally to lift trucks, and more specifically, to a telescopic mast assembly for lift trucks. This is a divisional application of application Serial No. 412,439, filed February 25, 1954, now abandoned.

Our present invention is particularly concerned with a telescopic mast assembly which comprises an outer upright guideway that is mounted on the truck frame, and an inner upright guideway that is slidably mounted in the outer upright guideway. The inner upright guideway is adapted to receive and support a vertically movable load supporting carriage.

One feature of our present invention resides in the provision of a telescopic hydraulic assembly which comprises inner, intermediate and outer cylinders, with at least two of them being actuatable successively vertically.

Another feature of our present invention resides in the arrangement of the cylinders of the hydraulic assembly which causes fluid admitted to the latter to move first the outer cylinder relative to the inner and intermediate cylinders and thereafter the intermediate and outer cylinders relative to the inner cylinder.

It is still another object of our present invention to provide a mast assembly which will not interfere with the truck operator's vision in a forward direction.

In accomplishing the latter object, we provide a pair of multiple cylinder hydraulic assemblies, with one being arranged at either side of the truck immediately forwardly of the inner and outer uprights. By providing spaced hydraulic assemblies at either side of the truck, rather than a single hydraulic assembly intermediate of the uprights, the operator's vision in a forward direction is improved considerably.

It is a further object of our present invention to provide a mast assembly wherein the elements thereof are so arranged that the counterweight required at the rear of the vehicle may be decreased without sacrificing load capacity.

The afore-noted object is accomplished by arranging the center of gravity of the mast assembly rearwardly of the axis of rotation of the forward vehicle wheels for decreasing the moment acting at the forward end of the truck and thus permitting a lighter counter-weight to be employed at the rear of the vehicle. More specifically, the inner and outer uprights are arranged rearwardly of the axis of rotation of the forward vehicle wheels while the pair of hydraulic assemblies are arranged forwardly of the axis of rotation of the forward vehicle wheels. In this construction, the load supporting carriage is provided with forwardly extending support members which are movable vertically intermediate of the pair of hydraulic assemblies.

Now, in order to acquaint those skilled in the art with the manner of constructing and using mast assemblies in accordance with the principles of our present invention, we shall describe in connection with the accompanying drawings, preferred embodiments of our invention.

Figure 2:
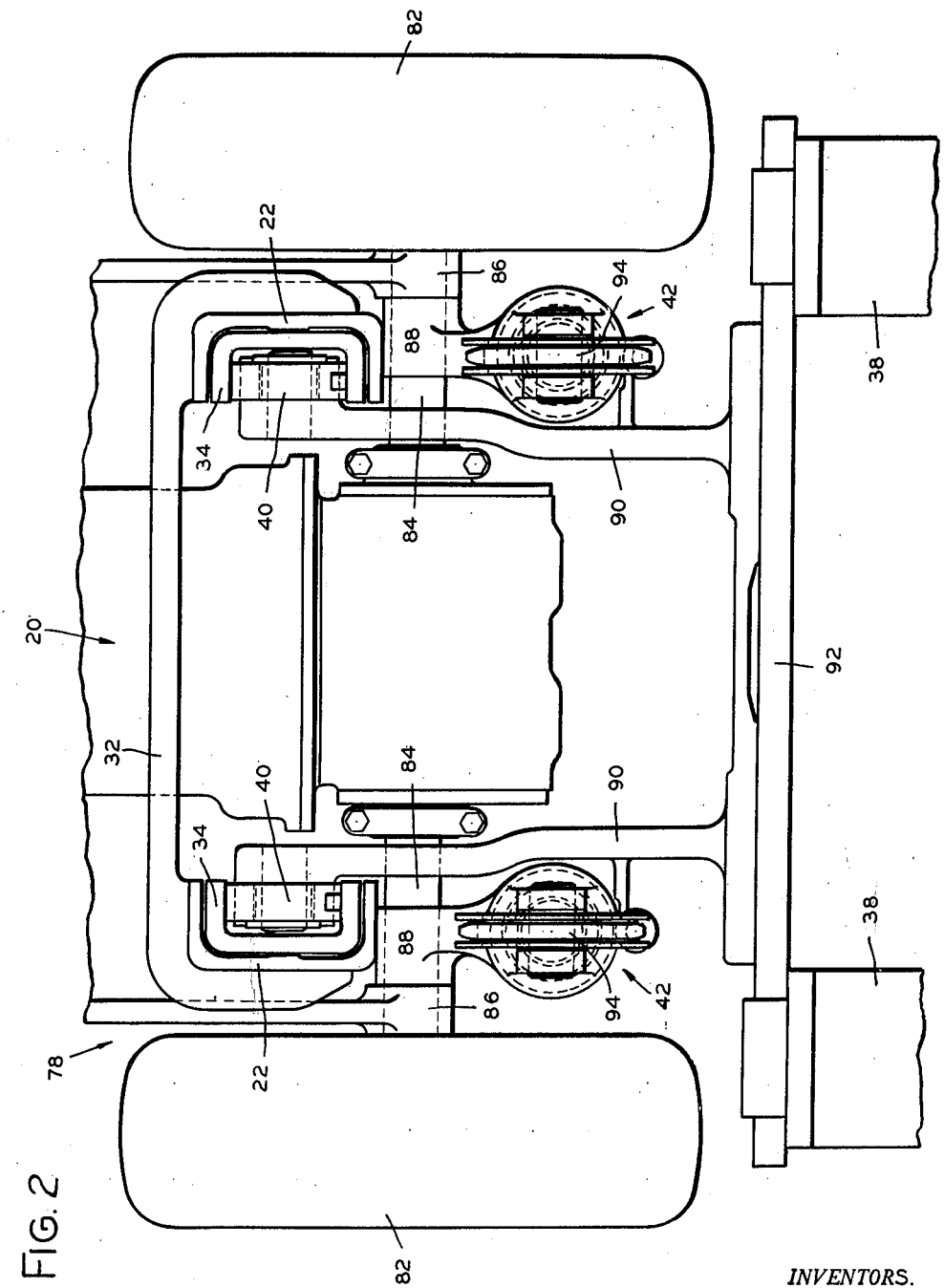
Figure 3:
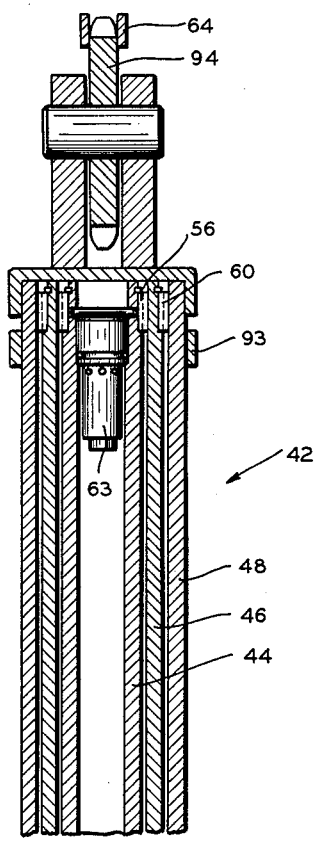
Figure 3:
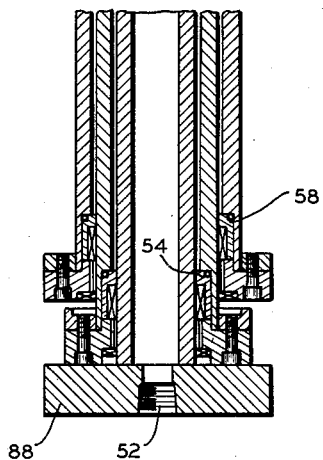

In the drawings:
FIGURE 1 is a partial side elevational view of a lift truck which embodies our present invention;
FIGURE 2 is a partial plan view of the mast assembly shown in FIGURE 1; and
FIGURE 3 is an enlarged vertical sectional view, with portions being broken away for the sake of clarity, showing the hydraulic assembly of our present invention.

Referring now to FIGURES 1 and 2, we shall describe a preferred embodiment of our present invention. The reference numeral 78 indicates a rider type industrial truck which comprises a main frame 80 that is supported at its forward end on a pair of spaced rotatable ground engaging wheels 82 which in this case may be the drive wheels. The wheels 82 are journalled at the outer ends of a transversely extending axle housing 84 which is secured in a known manner in bracket portions 86 of the main frame 80. The housing 84, immediately inwardly of the bracket portions 86, at each side of the truck, supports frame members 88 which extend downwardly and then project forwardly and rearwardly. The rearward ends of the frame members 88 support the lower end of an upright assembly 20.

The upright assembly 20 comprises a pair of spaced channel members 22, constituting an outer upright guideway, which have slidably mounted therein channel members 34, constituting an inner upright guideway. Mounted for vertical movement within the upright assembly 20 is a load supporting carriage 90 which includes horizontally spaced forwardly extending support members having secured to their forward ends a transverse plate 92. The plate 92, in turn, supports L-shaped fork frames 38 or any other load gripping or carrying attachment. The rear ends of the support members of the carriage 90 are provided with rollers 40 which have rolling contact with the inner upright guideway 34.

Relative movement between the carriage 90, the inner upright 34 and the outer upright 22 is adapted to be effected by means of a pair of hydraulic assemblies indicated generally at 42. The assemblies 42 are supported at their lower ends on the forward ends of the frame members 88 and are stabilized at their upper ends by brace means 93. Each of the hydraulic assemblies 42 comprises three concentric cylinders with the outer and intermediate cylinders being actuatable successively vertically as will be described in detail below. The upper ends of the outer cylinders 48 carry rotatable sprockets 94 over which are trained chains 64. The chains 64 are secured at their one ends to vertically extending rods 96 which at their lower ends are anchored by brackets to the lower ends of the intermediate cylinders of the hydraulic assemblies 42. The other ends of the chains 64 are suitably secured at 98 to the load supporting carriage 90. As best shown in FIGURE 2, the load supporting carriage projects forwardly between the pair of hydraulic assemblies 42.

Referring to FIGURE 3, each of the pair of hydraulic assemblies 42, in general, comprises a plurality of relatively movable elements, and, more specifically, comprises three concentric cylinders 44, 46 and 48, with the outer and intermediate cylinders being actuatable successively vertically. Each inner cylinder 44, at its lower end, is mounted upon the forward end of the respective support frame member 88.

As shown in FIGURE 3, the lower end of the inner cylinder 44 is formed with a port 52 through which fluid may be admitted to the interior thereof. The truck 78 is provided with fluid pressure developing means (not shown) and fluid is transmitted to the port 52 through a hose line (not shown) with the fluid flow being controlled remotely by the operator of the truck 78.

The lower end of the intermediate cylinder 46 is provided with seal means 54 which not only serves to prevent fluid leakage therepast, but also, upon extension of the intermediate cylinder 46, engages the stop means 56 at the upper end of the inner cylinder 44 for limiting the upward travel of the intermediate cylinder. The lower end of the outer cylinder 48 is correspondingly fitted with seal means 58 which both prevents fluid leakage therepast and, upon extension of the outer cylinder 48, engages the stop means 60 at the upper end of the intermediate cylinder 46, for causing the intermediate cylinder to move conjointly with the outer cylinder. The outer cylinder 48 is first movable vertically relative to the inner and intermediate cylinders 44 and 46, and thereafter the intermediate and outer cylinders 46 and 48 move conjointly relative to the inner cylinder 44.

The upper end of the outer cylinder 48 is closed and serves as a cross head for supporting pulley means comprising the rotatable sprocket 94 over which is trained chain 64, as explained above. The chains 64 serve to raise the carriage 90 to the upper end of the inner upright 34 and thereafter conjointly raise the inner upright 34 and carriage 90 within the outer upright 22.

In the operation of the mast assembly of our present invention, fluid under pressure may be selectively admitted to the ports 52 formed in the inner cylinders 44 of the hydraulic assemblies 42. The fluid is forced upwardly within the inner cylinders 44 and exerts an upward pressure on the closed end of the outer cylinders 48 whereupon the latter are moved upwardly relative to the inner and intermediate cylinders 44 and 46. As the outer cylinders 48 move upwardly, the chains 64 ride over the sprockets 94 and move the load supporting carriage 90 upwardly within the inner upright 22. The load supporting carriage 90 moves at a 2:1 ratio relative to the movement of the outer cylinder 48 of the hydraulic assembly in a well-known manner.

When the load supporting carriage 90 reaches the top of the inner upright 34, the carriage contacts a cross member, not shown, which is connected across the top edges of upright channels 34, and causes the inner upright to move upwardly conjointly with the carriage relative to the outer upright 22. During this upward movement of the load supporting carriage 90 and the inner upright 34, the seal means 58 at the bottom of each outer cylinder 48 engages the stop means 60 at the upper end of each intermediate cylinder 46 and serves to draw the intermediate cylinder 46 upwardly conjointly with the outer cylinder. Conjoint movement of the intermediate and outer cylinders 46 and 48 may continue until the seal means 54 at the bottom of the intermediate cylinder 46 engages the stop means 56 at the upper end of the inner cylinder 44.

It is to be noted that the rods 96 to which the one ends of the chains 64 are secured, move upwardly conjointly with the intermediate cylinders. Consequently after each outer cylinder 48 has been moved to the limit of its movement relative to the intermediate 46, the outer and intermediate cylinders and the carriage thereafter move conjointly. From the foregoing description, it will be apparent that we have provided a mast assembly wherein the load supporting carriage moves vertically first at a 2:1 ratio relative to the movement of the hydraulic assembly and then at a 1:1 ratio. By employing the two ratios of movement in this manner, the over-all height of the mast assembly at any given vertical position of the load supporting carriage is maintained at a minimum.

In order to achieve the operation just described, it is essential that the cylinders 44, 46 and 48 of each assembly 42 be of the correct dimensions to assure that the intermediate cylinder 46 will not start to rise before the outer cylinder 48. It will be understood that the force pushing up on cylinder 48 is proportional to the area defined by the projection of the inside margin of sealing means 58 on the end of cylinder 48. Simultaneously a force acts downwardly on the intermediate cylinder which is proportional to the area defined by the inside margin of sealing means 58 minus an area equal to that defined by the inner margin of sealing means 54. This downward force must be greater than one half of the larger force pushing upwardly on cylinder 48 because one half of the larger force acts through the chain 64 on the bracket which connects the intermediate cylinder to rod 96 while the other half acts on the carriage 90. Therefore, if the mechanism is properly proportioned, the force pushing down the intermediate cylinder will exceed the force exerted by chain 64 on rod 96 tending to cause cylinder 46 to rise, and the outer cylinder 48 will rise first.

The mechanism would operate if the intermediate cylinders started to rise first, but it would not provide a large free lift as it does otherwise (free lift being defined as the maximum fork height attainable without any increase in the over-all height of the machine). It will be understood that if the carriage moved upwardly conjointly with the hydraulic assemblies 42, as would be the case if the intermediate cylinders moved first, the top of the hydraulic assemblies (that is, the closed upper surface of cylinders 48) would contact the above-mentioned cross member which connects the top of channels 34 and start the inner upright moving upwardly while the carriage and forks were still at a comparatively low level. However, when the outer cylinders move first, the carriage and forks move upwardly at a 2:1 ratio with respect to the hydraulic assemblies, so that the carriage and forks can move upwardly much farther before any increase occurs in the over-all height of the machine.

In understanding the foregoing explanation of forces acting on the various cylinders, it should be understood that stops 56 and 60 are arranged to admit fluid under pressure down between the inner and intermediate cylinders and between the intermediate and outer cylinders.

When it is desired to lower the load supporting carriage 90 from its maximum elevation to the position shown in FIGURE 1, the fluid under pressure need only be bled from the inner hydraulic cylinders 44, through the ports 52. This permits the weight of the elements of the upright assembly and load to force the intermediate and outer cylinders of the hydraulic assemblies downwardly while the carriage 90 is permitted to be lowered at the end of the chains 64 until the upright and hydraulic assemblies 34 and 42 are fully nested as illustrated.

The device 63 in cylinder 44 near the top of the cylinder is a flow regulator, or flow control device, which may be employed if desired. This device varies the rate of fluid flow out of the hydraulic assembly, dependent upon the hydraulic pressure. It is arranged so that the flow varies inversely with the pressure. Hence the heavier the load on the fork the slower the lowering speed of the forks. This device serves as a safety device to prevent rapid descent of a load in the event of a break in the hydraulic line between the hydraulic assembly and the control valve. It also prevents incorrect operation of the mechanism by lowering a heavy load too rapidly.

It will be quickly recognized by those skilled in the art that since a pair of hydraulic actuating assemblies 42 are provided, with one being arranged at either side of the truck, the visibility of the operator of the vehicle is not impaired when he is looking forwardly as he can view the load or the area in front of the truck by looking between the upright members and the hydraulic assemblies. It is to be further noted that the elements of the mast are arranged so that the center of gravity thereof lies rearwardly of the axis of rotation of the drive wheels 82. This arrangement stabilizes the vehicle and permits a relatively lighter counterweight to be employed at the rear end of the vehicle.

Now while we have shown and described what we believe to be a preferred embodiment of our present invention, it will be understood that various rearrangements and modifications may be made therein without departing from the spirit and scope of our invention.

We claim:

1. In a lift truck having a main frame and a pair of transversely spaced ground engaging wheels mounted adjacent the forward end of the frame, the combination of an upright assembly comprising an outer upright guideway including transversely spaced channeled members and an inner upright guideway including transversely spaced channeled members, the longitudinal center line of the upright assembly lying rearwardly of the axis of rotation of said wheels, a load supporting carriage supported by and vertically movable in said inner upright guideway, a pair of transversely spaced hydraulic assemblies carried at the forward end of the main frame and arranged forwardly of and substantially in line with the channeled members of the outer upright guideway and rearwardly of said carriage, each of said hydraulic assemblies comprising relatively vertically movable elements, and means associated with said carriage and said hydraulic assemblies for moving said carriage relative to said inner upright guideway and said inner upright guideway relative to said outer upright guideway upon actuation of said hydraulic assemblies.

2. In a lift truck having a main frame, transversely spaced ground engaging rotatable wheels at the forward end thereof, the combination of a single upright assembly carried by the main frame rearwardly of the axis of rotation of the rotatable wheels, a load supporting carriage supported from and vertically movable in said upright assembly, a pair of transversely spaced hydraulic assemblies carried by the main frame forwardly of the axis of rotation of said rotatable wheels, said carriage being supported forwardly of said hydraulic assemblies, and means associated with said carriage and said hydraulic assembly for moving said carriage relative to said upright assembly upon actuation of said hydraulic assembly.

3. In a lift truck having a main frame, transversely spaced ground engaging rotatable wheels at the forward end thereof, the combination of an upright assembly carried by the main frame rearwardly of the axis of rotation of the rotatable wheels, said upright assembly comprising an outer upright guideway and an inner upright guideway, a pair of hydraulic assemblies one being arranged on either side of the truck forwardly of the axis of rotation of said rotatable wheels, a load supporting carriage vertically movable in said inner upright guideway and extending forwardly between said hydraulic assemblies, and means associated with said carriage and said hydraulic assemblies for moving said carriage relative to said inner upright guideway and said inner upright guideway relative to said outer upright guideway upon actuation of said hydraulic assemblies.

4. In a lift truck having a main frame, transversely spaced ground engaging rotatable wheels at the forward end thereof, the combination of an upright assembly carried by the main frame rearwardly of the axis of rotation of said rotatable wheels, said upright assembly comprising an outer upright guideway including a pair of transversely spaced channel members and an inner upright guideway including a pair of transversely spaced channel members, a pair of hydraulic assemblies carried by the main frame forwardly of the axis of rotation of the rotatable wheels with the hydraulic assemblies being arranged substantially in line with the channel members of said outer upright guideway, a load supporting carriage vertically movable in said inner upright guideway and projecting forwardly between said pair of hydraulic assemblies, each of said hydraulic assemblies comprising inner, intermediate and outer concentric cylinders with the latter two cylinders being actuatable successively vertically, and means including sprocket and chain means associated with said carriage and said hydraulic assemblies for raising said carriage to the upper end of said inner upright and thereafter conjointly raising said inner upright and carriage within said outer upright upon actuation of said hydraulic assemblies.

5. In a lift truck having a main frame including a pair of transversely spaced longitudinally extending frame members and a transverse wheeled axle means supporting said frame members adjacent the forward ends thereof, an upright mast structure forming guideways supported from said axle means at a location spaced longitudinally rearwardly of said axle means, a pair of transversely spaced hoist motor means supported by said axle means and spaced longitudinally forwardly of said mast structure, load carrying means supported in said mast structure for vertical movement relative thereto and spaced longitudinally forwardly of said hoist motor means, and means interconnecting said load carrying means, said hoist motor means and said mast structure such that actuation of said hoist motor means effects elevating movement of said load carrying means in said mast structure.

6. A lift truck as claimed in claim 5 wherein longitudinally extending bracket means are connected between said mast structure and said load carrying means, roller means connect said bracket means to said mast structure, and said pair of hoist motor means are spaced transversely in substantial longitudinal alignment with opposite sides of said mast structure.

References Cited in the file of this patent

UNITED STATES PATENTS

| | | |
|---|---|---|
| 1,725,624 | Dixon | Aug. 20, 1929 |
| 2,156,204 | Stolze | Apr. 25, 1939 |
| 2,456,320 | Repke | Dec. 14, 1948 |
| 2,545,417 | Ulinski | Mar. 13, 1951 |
| 2,623,653 | Framhein | Dec. 30, 1952 |
| 2,627,943 | Hastings | Feb. 10, 1953 |
| 2,634,587 | Ptak | Apr. 14, 1953 |
| 2,645,306 | Turner | July 14, 1953 |
| 2,653,678 | Lehrman | Sept. 29, 1953 |
| 2,666,501 | Abbe | Jan. 19, 1954 |
| 2,670,811 | Shaffer | Mar. 2, 1954 |
| 2,738,087 | Arnot | Mar. 13, 1956 |
| 2,929,524 | Carlson et al. | Mar. 22, 1960 |